United States Patent
Gehrlein

(10) Patent No.: US 12,298,262 B2
(45) Date of Patent: May 13, 2025

(54) DEVICE FOR CLOSING THE INPUT OPENING IN THE SAMPLE CHAMBER IN AN X-RAY FLUORESCENCE SPECTROMETER

(71) Applicant: Bruker AXS GmbH, Karlsruhe (DE)

(72) Inventor: Wolfgang Gehrlein, Ruelzheim (DE)

( * ) Notice: Subject to any disclaimer, the term of this patent is extended or adjusted under 35 U.S.C. 154(b) by 193 days.

(21) Appl. No.: 18/052,275

(22) Filed: Nov. 3, 2022

(65) Prior Publication Data
US 2023/0143497 A1    May 11, 2023

(30) Foreign Application Priority Data
Nov. 8, 2021  (DE) .......................... 102021212535.2

(51) Int. Cl.
  *G01N 23/2204*  (2018.01)
  *G01N 23/223*  (2006.01)

(52) U.S. Cl.
  CPC ....... *G01N 23/2204* (2013.01); *G01N 23/223* (2013.01); *G01N 2223/076* (2013.01); *G01N 2223/1016* (2013.01); *G01N 2223/307* (2013.01); *G01N 2223/321* (2013.01); *G01N 2223/637* (2013.01)

(58) Field of Classification Search
  None
  See application file for complete search history.

(56) References Cited

U.S. PATENT DOCUMENTS

| | | | | | |
|---|---|---|---|---|---|
| 4,491,145 | A | * | 1/1985 | Williams | ................ F16K 3/182 251/169 |
| 4,634,866 | A | * | 1/1987 | Conway | .............. H01J 49/0413 250/284 |
| 5,769,952 | A | * | 6/1998 | Komino | .................. F16K 51/02 118/733 |

(Continued)

FOREIGN PATENT DOCUMENTS

| | | |
|---|---|---|
| DE | 102019001115 A1 | 8/2020 |
| EP | 1033514 A1 | 9/2000 |

(Continued)

OTHER PUBLICATIONS

Bruker Corporation: S8 Tiger series 2. 2021. URL: https://www.bruker.com/de/products-and-solutions/elemental-analyzers/xrfspectrometers/s8-tiger.html, archived in https://web.archive.org on May 12, 2021, [retrieved on Feb. 14, 2022].

(Continued)

*Primary Examiner* — Thomas R Artman
(74) *Attorney, Agent, or Firm* — BENOIT & COTE INC.

(57) ABSTRACT

A closure device for the gas-tight closing of the input opening of a sample chamber of an x-ray analysis apparatus includes a slider having a closure plate and a carriage that is configured to be displaced in a lateral movement over the input opening on a linear guide arranged on a baseplate connected fixedly to the sample chamber. The closure plate is connected in an articulated manner to the carriage via deflecting elements that, upon butting against end stops connected rigidly to the baseplate, deflect the lateral move- (Continued)

ment of the carriage into a movement perpendicular thereto to press the closure plate over the input opening. A drive motor connected to the carriage via a drive means displaces the slider to provide the lateral movement on the linear guide.

18 Claims, 3 Drawing Sheets

(56) References Cited

U.S. PATENT DOCUMENTS

| | | | |
|---|---|---|---|
| 6,233,307 B1 | 5/2001 | Golenhofen | |
| 6,902,703 B2* | 6/2005 | Marquiss | B01L 3/50853 436/180 |
| 6,935,828 B2* | 8/2005 | Ackeret | H01L 21/67742 414/217 |
| 7,873,143 B2* | 1/2011 | Dunham | G01N 23/2204 378/46 |
| 8,492,155 B2* | 7/2013 | Bunce | G01N 35/04 422/65 |
| 11,460,113 B2 | 10/2022 | Netzer | |
| 2001/0048899 A1* | 12/2001 | Marouiss | B01L 3/50853 422/63 |
| 2004/0013501 A1 | 1/2004 | Ackeret et al. | |
| 2009/0141862 A1 | 6/2009 | Dunham et al. | |
| 2009/0155823 A1* | 6/2009 | Bunce | G01N 35/04 435/7.92 |
| 2022/0136609 A1* | 5/2022 | Netzer | F16K 3/184 251/204 |
| 2023/0143497 A1* | 5/2023 | Gehrlein | G01N 23/223 378/45 |

FOREIGN PATENT DOCUMENTS

| | | |
|---|---|---|
| EP | 0955539 B1 | 6/2004 |
| EP | 2282086 A2 | 2/2011 |
| EP | 3239567 A1 | 11/2017 |
| JP | H10335406 A | 12/1998 |
| JP | 2001153760 A | 6/2001 |
| JP | 2016211639 A | 12/2016 |
| JP | 6077812 B2 | 2/2017 |

OTHER PUBLICATIONS

Bruker Corporation: S2 Puma series 2. 2021. URL: https://www.bruker.com/en/products-and-solutions/elemental-analyzers/xrfspectrometers/s2-puma-series2.html, archived in https://web.archive.org/ on May 18, 2021, [retrieved on Feb. 24, 2022].

Bruker Corporation: S2 Polar. 2021. URL: https://www.bruker.com/en/products-andsolutions/elemental-analyzers/xrf-spectrometers/s2-polar.html, archived in https://web.archive.org/ on May 18, 2021, [retrieved on Feb. 23, 2022].

Bruker Corporation: S6 Jaguar. 2021. URL: https://www.bruker.com/en/products-andsolutions/elemental-analyzers/xrf-spectrometers/s6-jaguar.html, archived in https://web.archive.org/ on Sep. 17, 2021, [retrieved on Feb. 22, 2022].

Thermo Scientific: ARL PERFORM'X WDXRF Spectrometer for Materials and Minerals Analysis, URL: https://www.youtube.com/watch?v=BAsEaF8mGCk from 0:43min, [Retrieved Nov. 22, 2022].

Thermo Scientific: ARL PERFORM'X Sequential XRF Spectrometer for Advanced Materials Characterization, URL: https://www.youtube.com/watch?v=1euCi_kFcw4 from 0:35min, [Retrieved Nov. 22, 2022].

Thermo Fisher: ARL OPTIM'X Wavelength-Dispersive X-ray Fluorescence (WDXRF) Spectrometer for Smart & Optimized Elemental Analysis, URL: https://videos.thermofisher.com/detail/video/6147424371001/arl-optim-x-wavelength-dispersive-x-ray-fluorescence-wdxrf-spectrometer-for-smart-optimized-elemental-analysis from 1:13min, [Retrieved Nov. 22, 2022].

Rigaku Corporation: Smart Sample Loading System (SSLS) for the Rigaku ZSX Primus, URL: https://www.youtube.com/watch?v=YzyTWnKd8PY 1:20min / 1:50min, [Retrieved Nov. 22, 2022].

AZONANO: PANalytical AXIOS X-Ray Fluorescence (XRF) Spectrometer—Features and Applications, URL: https://www.azonano.com/nanotechnology-video-details.aspx?VidID=315 from 1:50min, [Retrieved Nov. 22, 2022].

\* cited by examiner

DEVICE FOR CLOSING THE INPUT OPENING IN THE SAMPLE CHAMBER IN AN X-RAY FLUORESCENCE SPECTROMETER

BACKGROUND OF THE INVENTION

Field of the Invention

The invention relates to a closure device for gas-tight closing of the input opening in a sample chamber of an x-ray analysis apparatus, in particular an x-ray fluorescence spectrometer, by means of a slider which is displaceable laterally over the input opening on a linear guide. Such a closure device is disclosed in the document JP 6077812 B2.

Description of the Related Art

The present invention is concerned very generally with the sphere of x-ray analysis apparatuses and in particular with closure devices for gas-tightly closing input openings in the sample chambers of x-ray analysis apparatuses, such as, for example, x-ray fluorescence spectrometers.

In most x-ray fluorescence spectrometers, a sample is excited in a measurement chamber by x-ray radiation. The excited sample emits characteristic x-ray radiation which is analyzed by a system of various x-ray optical components or using an energy-dispersive detector, in order to determine the concentration of the elements in the sample.

So that the x-ray radiation is attenuated as little as possible along the beam path of the x-ray radiation, the beam path is located under vacuum or in an atmosphere which has little absorbency and is chemically inert (e.g., He or $N_2$). Since, in general, readily volatile samples (such as, for example, liquids) which cannot be measured under a negative pressure are also investigated, a positive pressure—which is generally relatively less than the outside atmosphere—is produced in the measurement chamber for flushing the measurement chamber with an inert gas. A suitable measurement chamber therefore has to have a controlled closure so that the sample can be brought into the measurement position by a more or less automatable handling system or by hand and can subsequently be kept closed radiation-tightly and, furthermore—at least during the measurement—closed both vacuum-tightly and tightly to positive pressure.

A closure device for gas-tightly closing the input opening by means of a slider has been disclosed, for example, in the x-ray fluorescence spectrometer "S8 TIGER Series 2" from Bruker Corporation, Billerica (Massachusetts, USA), (cf. https://www.bruker.com/de/products-and-solutions/elemental-analyzers/xrf-spectrometers/s8-tiger.html (retrieved Oct. 22, 2021).

In the TIGER, a slider is pushed in a guide track over the input opening to the sample by a linear movement. The guide track is designed in such a manner that the slider is pressed in the end position onto the seal of the input opening by gravitational force. When evacuating the sample chamber, the difference in pressure generates a force leading to the sealing of the input opening. The linear movement of the slider is realized by a lever on a direct-current geared motor (DC geared motor).

However, a disadvantage in this case is that the slider is pressed only by its own weight onto the seal of the input opening, as a result of which the positive pressure tightness is ensured only up to a very small differential pressure in relation to the outside atmosphere. Furthermore, when flushing the sample chamber with inert gas, large quantities of inert gas may be lost, as a result of which the operating costs increase.

Further examples of closure devices for gas-tightly closing the input openings by means of a slider are found, for example, in the x-ray fluorescence spectrometer "S2 PUMA Series 2", cf. https://www.bruker.com/en/products-and-solutions/elemental-analyzers/xrf-spectrometers/s2-puma-series2.html (retrieved Oct. 22, 2021), in the x-ray fluorescence spectrometer "S2 POLAR", cf. https://www.bruker.com/en/products-and-solutions/elemental-analyzers/xrf-spectrometers/s2-polar.html (retrieved Oct. 22, 2021), and in the x-ray fluorescence spectrometer "S6 JAGUAR", cf. https://www.bruker.com/en/products-and-solutions/elemental-analyzers/xrf-spectrometers/s6-jaguar-.html (retrieved Oct. 22, 2021), all from the Bruker Corporation, Billerica (Massachusetts, USA).

The general configuration of the PUMA, POLAR and JAGUAR are similar to the TIGER. The linear movement of the slider is undertaken here by a rack and pinion drive, and the slider, in the closed position (end position), is pulled downward onto the seal of the input opening additionally with the aid of electromagnets.

A disadvantage of the solution using electromagnets is that the adjustment of the electromagnets is normally very complicated. In the event of faults or irregularities in the magnetic field that obstruct or even prevent secure closing of the input opening, it may frequently be quite difficult and time-consuming to readjust the electromagnets.

Further closure devices which are provided with a pivoting mechanism or a folding cover mechanism are known in the prior art.

The spectrometers equipped in such a way can also be provided with a sampler changer, wherein the sample chamber can be loaded with a sample by means of a movable gripping arm. The input opening is then covered by a closure cap. The closure cap is fastened to a connecting plate which can be pivoted by means of a deflecting roller.

Disadvantages of the closure devices from the prior art mentioned include the fact that the pivoting or folding mechanism in the respective configuration may frequently take up a large amount of space because of the intended pivotability, and it is generally relatively complex and thus causes non-negligible costs for the production and subsequent maintenance thereof.

A particular disadvantage is that the cover, since it has merely been placed on, is not arranged completely parallel to the sealing ring and may also slightly slip and therefore generally ensures only a low degree of tightness in relation to positive pressure.

JP 6077812 B2 cited at the beginning describes a—exclusively laterally—displaceable slider for gas-tightly closing the input opening in the sample chamber of a transportable sample holder. Measurement and sample preparation are carried out in different vacuum surroundings. For the sample preparation, the sample is inserted into the sample holder under reduced atmospheric pressure. The slider then closes the opening in the sample holder. This takes place by the slider being moved laterally over the sample holder. The sample holder has recesses into which the slider lying above it drops because of its own weight. By this means, the sample chamber of the sample holder is closed and a certain initial tightness produced. The sample holder is then retrieved from the surroundings with a reduced atmospheric pressure and transported to the spectrometer under the customary outside atmosphere. The force which arises from the surface and the pressure difference from the customary outside atmosphere and the artificially generated atmosphere in the sample chamber of the sample holder then acts as a sealing force on the slider. The sample holder is introduced into the measurement chamber of the spectrometer and then the measurement chamber is evacuated. The slider can then be opened by motor and, for example, an XRF measurement started.

It is likewise disadvantageous here that closing of the sample chamber with secure tightness to positive pressure is in turn possible only to a limited extent. However, specifically in the case of measuring liquid samples, it is virtually always necessary to keep the sample chamber under a protective gas atmosphere. Measurements of liquid samples under vacuum are often possible only with extreme difficulty, and generally not possible at all since—depending on the solvent of the liquid sample—the boiling point of the liquid sample is always reduced under vacuum and the liquid sample passes at its surface into the gas phase.

Furthermore, the measurements may be made difficult by the fact that the sample preparation, on the one hand, and the measurement, on the other hand, are undertaken in various surroundings which are spatially separated from one another.

SUMMARY OF THE INVENTION

The present invention is directed to a closure device of the type described at the beginning for gas-tight closing of the input opening in a sample chamber of an x-ray fluorescence spectrometer with uncomplicated, easily creatable or available technical means, and includes configuring a slider, which is displaceable laterally over the input opening, in such a manner that the slider can easily reliably close the input opening to the sample both vacuum-tightly and also tightly to positive pressure.

In the present invention, the slider comprises a closure plate and a carriage which is configured in such a manner that it can be displaced over the input opening in the sample chamber on the linear guide which is arranged on a baseplate connected fixedly to the sample chamber. The closure plate is connected in an articulated manner to the carriage via deflecting elements which, upon butting against an end stop connected rigidly to the baseplate, deflect the lateral movement of the carriage into a movement perpendicular thereto in order to press the closure plate onto the input opening. The slider is displaceable laterally on the linear guide by a drive motor, which is connected to the carriage via a drive means.

The present invention therefore involves configuring the slider of the closure device in such a manner that a lateral movement onto the slider is deflected into a movement perpendicular to said lateral movement and, therefore, the input opening in the sample chamber ("sample chamber opening") can be closed both vacuum-tightly and also tightly in relation to a positive pressure in the interior of the sample chamber relative to the outside atmosphere.

For this purpose, the slider comprises a closure plate and a carriage. The carriage can be displaced along the linear guide. The linear guide is arranged on a baseplate. The baseplate is fixedly connected to the sample chamber. The carriage (and therefore also the closure plate) can be displaced in a linear movement over the input opening in the sample chamber. The closure plate then lies over the input opening in the sample chamber (in a closed position).

Furthermore, the closure plate is connected movably, in particular in an articulated manner, to the carriage via deflecting elements ("connecting lever").

The baseplate comprises an end stop connected rigidly thereto ("stop point"). The carriage is displaced or moved laterally into the closed position. The deflecting elements then collide with the end stop. The carriage is moved further, as a result of which the movable deflecting elements move. This movement is transmitted to the closure plate. The closure plate moves perpendicularly to the lateral movement of the carriage. The deflecting elements therefore deflect the lateral movement of the carriage into a perpendicular movement of the closure plate. The closure plate is then pushed or placed uniformly onto the input opening. Whether the pushing-on movement takes place upward or downward depends, inter alia, on the respective geometry of the x-ray analysis apparatus.

The force which acts here on the input opening can be adjusted by the length of extent of the displacement of the carriage and resultantly caused movement of the deflecting elements against the end stop of the baseplate. If the carriage is moved away from the end stop, the closure plate is lifted off from the input opening and the pressure against the input opening released.

Alternatively, instead of moving the deflecting elements against the end stop, the closure plate may also be moved against a protrusion of the baseplate. In this case, the deflecting elements likewise deflect the lateral movement of the carriage into a vertical movement of the closure plate onto the input opening.

The slider is displaced laterally on the linear guide via a drive motor. The drive motor is connected to the carriage of the slider via a drive means. By means of the drive motor, a uniform displacement can be undertaken and the contact pressure of the closure plate against the input opening in the sample chamber can be adjusted to a desired degree.

The closure device is configured in such a manner that only one drive motor is needed both for the lateral movement and for the movement perpendicular thereto, of the closure plate of the slider. The movement with which the input opening in the sample chamber is covered and opened by the closure plate, and the movement with which the closure plate is pressed onto the input opening in the sample chamber and lifted off from the input opening in the sample chamber, are therefore carried out only by a single active element, namely the drive motor. The size of the design, in particular the overall height, can thereby be kept small. In addition, further drive motors are unnecessary and the costs thereby reduced.

In a preferred class of embodiments of the closure device according to the invention, it is provided that at least some of the deflecting elements are configured as rotary levers, in particular as a (preferably curved) rigid lever which is mounted on the carriage so as to be rotatable about a rigid shaft.

By means of the rotary levers, the lateral movement of the carriage can be deflected particularly readily into a vertical movement with respect thereto. In addition, the rotary lever can transmit the force acting thereon in a particularly precise and defined manner to the closure plate by means of the lateral movement of the carriage.

In advantageous developments of this class of embodiments, it is furthermore provided that the rotary lever has a portion with an elongated hole in which a pin connected rigidly to the closure plate engages. The elongated hole is used as a guide element for the pin. By means of the elongated hole and the pin engaging in the elongated hole, the rotary lever and the closure plate can be displaced and correspondingly adjusted in relation to one another and tolerances can be compensated for.

Alternatively or additionally, in other developments, the closure plate can be shaped rectangularly, and the deflecting elements can comprise at least three rotary levers.

A rectangularly shaped closure plate is advantageous to produce and can be moved particularly simply in a linear movement. In addition, such a rectangularly shaped closure plate can press particularly uniformly onto the input opening in the sample chamber.

The at least three rotary levers make it possible for the vertical movement, with which the closure plate is pressed onto the input opening, to run parallel and a contact pressure of the closure plate to be distributed uniformly to the input opening. It is noted that the at least three rotary levers are attached to the closure plate and the carriage in such a manner that the contact pressure of the closure plate onto the input opening is as uniform as possible around the circumference thereof. Three rotary levers are therefore advantageous in particular in the case of circular closure plates; in the case of rectangularly shaped closure plates, four rotary levers which are each arranged at the corners of the closure plate are more advantageous for a uniform contact pressure.

Embodiments of the closure device according to the invention in which the linear guide comprises a guide rail which is arranged in particular in or on the baseplate are likewise preferred. The guide rail makes it possible to achieve a particularly precise, uniform and reliable movement of the carriage.

Embodiments in which there is a vertical guide device for guiding the movement of the closure plate in a direction perpendicular to its lateral movement, are also advantageous. In this way, the perpendicular movement of the closure plate can be reliably guided and a possible slipping during the perpendicular movement prevented. Furthermore, by means of the vertical guide device, the closure plate can be lowered very precisely onto the input opening and lifted from the input opening.

In further preferred embodiments, spring elements are arranged between the closure plate and the carriage, said spring elements being used to hold the closure plate and the carriage apart at a determined distance. By this means, the closure plate is already reliably prevented from colliding or coming into contact with the input opening or further components which are attached to the baseplate in the lateral movement of the carriage.

Furthermore, embodiments of the invention which are distinguished in that stop bolts, with which the closure plate butts against a stop on or in the baseplate, or vice versa, are attached to the closure plate, are preferred. The stop bolts can easily be attached to the closure plate. During a lateral movement of the closure plate, the stop bolts can butt particularly precisely against the stop. After butting against it, the lateral movement is then deflected via the deflecting elements into a movement of the closure plate perpendicular thereto.

Embodiments of the closure device according to the invention, in which the drive motor is in the form of an electric motor, preferably a stepping motor, are likewise advantageous. This can be realized particularly simply in practice. The slider with the closure plate can be moved precisely, in particular spatially very precisely in terms of target, in this way.

A class of embodiments of the closure device according to the invention that are distinguished in that the drive means via which the drive motor is connected to the carriage comprises a toothed belt drive and/or a drive chain and/or a push rod and/or a threaded spindle and/or a hydraulic slider and/or a pneumatic cylinder, is particularly preferred. In advantageous developments of this class of embodiments, the toothed belt drive and/or the drive chain run via a drive deflection roller and via a belt pulley. The drive deflection roller makes it possible to transmit the driving movement of the drive motor to the toothed belt drive or to the drive chain, and the drive motor. By this means, the drive motor can be flexibly positioned and the space required by the closure device is reduced. The toothed belt drive or the drive chain is tensioned via the belt pulley and the drive deflection roller.

Furthermore, variants of these developments, in which the drive deflection roller and/or the belt pulley are mounted resiliently, and preferably tensioned with a predefined force, in the direction of the carriage in relation to the baseplate, in particular in relation to the guide, via a spring tensioning element, are beneficial.

By means of the spring tensioning, the toothed drive belt and/or the drive chain can be tensioned with a predefined force. The pre-tensioning of the springs remains the same even if the toothed belt drive and/or the drive chain are distorted. Furthermore, by this means, the wear due to extending the toothed belt drive and/or the drive chain can be compensated for relatively simply.

Embodiments of the closure device according to the invention, in which the closure plate and/or the sample chamber have sealing elements in the region around the input opening, said sealing elements being configured in particular as sealing rings and optionally as grooves suitable for them or sealing surfaces, as counterparts, are likewise preferred. By this means, the sample chamber can be closed particularly effectively both in a manner tight to positive pressure and also vacuum-tightly.

An x-ray analysis apparatus, in particular an x-ray fluorescence spectrometer, containing a closure device according to the invention of the above-described type for gas-tight closing of the input opening in a sample chamber, also falls within the scope of the present invention.

This enables measurements to be carried out with the x-ray analysis apparatus, in which the sample chamber is intended to be kept both under vacuum (for example in the case of solid samples) and under pressure (for example for measuring liquids). The design of the closure device according to the invention has a particularly low overall height and is consequently usable in a particularly space-saving manner. By this means, in turn, the entire amount of space required by the x-ray analysis apparatus equipped with the invention can be reduced.

A method for operating a closure device according to the invention, as described above, or an x-ray analysis apparatus, as likewise described above, which method is distinguished in that the movements of the closure plate are carried out in a determined, specified, non-changeable sequence, likewise falls within the scope of the present invention.

During a forward movement, the carriage moves laterally together with the closure plate until the closure plate lies over the input opening and the deflecting elements butt against the stop, which is connected to the baseplate. The deflecting elements transfer the lateral movement, which acts on the carriage, into the movement which is perpendicular with respect thereto and which acts on the closure plate. During a return movement, the previously described steps proceed in the reverse sequence. The forward and return movement, and the lateral movement and the movement perpendicular thereto, can be realized by just one single drive motor.

Further advantages of the invention will become apparent from the description and the drawings. The features mentioned above and those presented below can likewise be used in each case according to the invention individually or together in any desired combinations. The embodiments shown and described should not be understood as an exclusive enumeration; on the contrary, they are of an exemplary character intended to describe the invention.

BRIEF DESCRIPTION OF THE DRAWINGS

The invention is illustrated in detail in the drawings and will be explained in more detail with reference to exemplary embodiments.

FIG. 1b shows a plan view from above of the exemplary first embodiment of the closure device according to the invention from FIG. 1a;

DETAILED DESCRIPTION

Figure 1A:
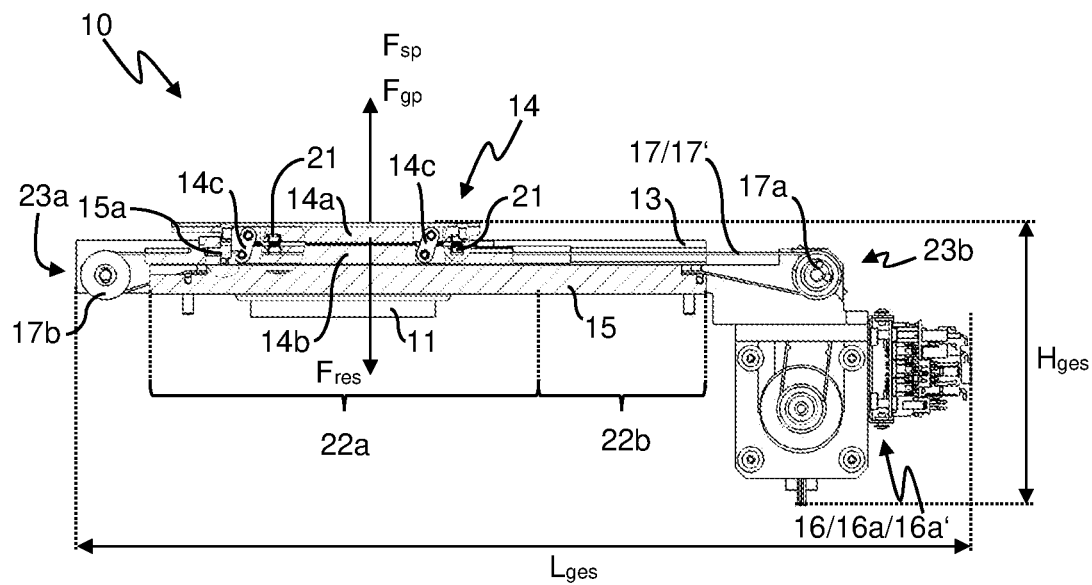
FIG. 1a shows a vertical sectional view of an exemplary first embodiment of the closure device according to the invention from the side.
Figure 1B:
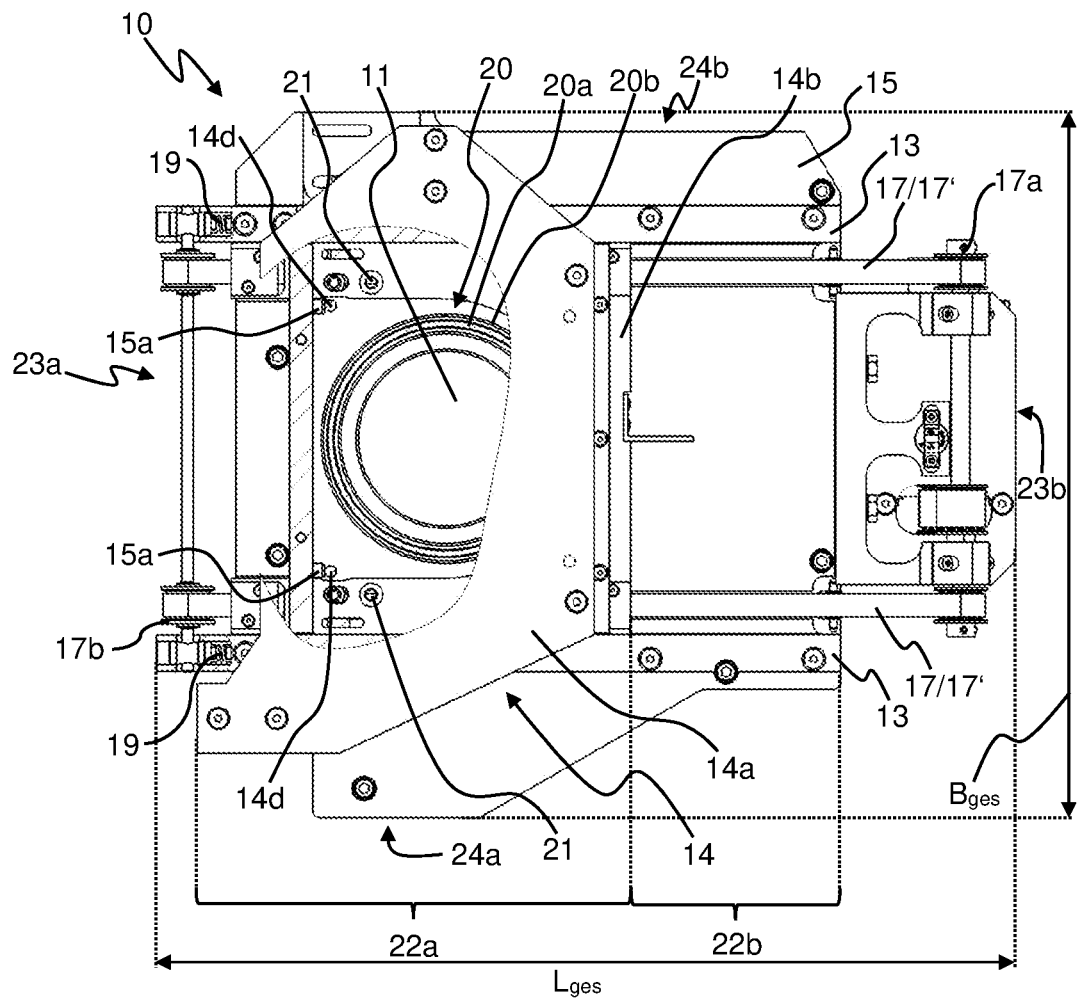

FIG. 1a and FIG. 1b show an exemplary first embodiment of a closure device 10 according to the invention in different views. The closure device 10 comprises an input opening 11, a slider 14 with a closure plate 14a for closing the input opening 11, a baseplate 15 with here two end stops 15a and a drive motor 16. It is noted that part of the closure plate 14a is not shown in FIG. 1b so as to therefore permit a better view of the components located under the closure plate 14a.

In the embodiment shown here, the input opening 11 is formed radially with a diameter of 90 mm. The input opening 11 is recessed here into the baseplate 15. In the figures shown here, the input opening 11 is arranged centrally in a first region 22a of the baseplate 15.

Arranged in the region around the input opening 11 are sealing elements 20 which are configured here as a sealing ring 20a with a groove 20b in which the sealing ring 20a can be embedded. The groove 20b serves as a counter part to the sealing ring 20a, and the input opening 11 can be reliably closed pressure-tightly and vacuum-tightly with the aid of the sealing ring 20a and the groove 20b.

In a further embodiment, not illustrated specifically here, it is also possible for the sealing elements 20 to be attached to the closure plate 14a. The sealing elements 20 are attached in that region of the closure plate 14a which comes to rest directly above the input opening 11 during closing of the input opening 11. The closure plate 14a can then close the input opening 11 pressure-tightly and vacuum-tightly.

In the embodiment shown here, the slider 14 comprises, in addition to the closure plate 14a, a carriage 14b, four deflecting elements 14c and two stop bolts 14d. The closure plate 14a is configured here as a flat, irregularly shaped plate with a thickness of 9 mm and is located here in the first region 22a of the baseplate 15. The closure plate 14a is connected to the carriage 14b via the four deflecting elements 14c. In this case, two deflecting elements 14c are arranged on a front side 24a and two deflecting elements on a rear side 24b of the closure device 10. The stop bolts 14d are attached to the closure plate 14a and, in FIG. 1b, butt against the two end stops 15a of the baseplate 15.

Furthermore, in the embodiment shown here, four spring spacer elements 21 are arranged between the closure plate 14a and the carriage 14b in order to space the closure plate 14a and the carriage 14b from each other. The spring spacer elements 21 are distributed uniformly near the edges of the closure plate 14a so that the spring force of the spring spacer elements 21 can be distributed uniformly over the closure plate 14a and the distance between the closure plate 14a and the carriage 14b is particularly consistent. A distance of here 2 mm is set out between the closure plate 14a and the carriage 14b by the spring spacer elements 21. By this means, the closure plate 14a can be sufficiently spaced apart from further components of the closure device 10, and a collision-free movement of the closure plate 14a by means of the carriage 14b achieved.

In the embodiment shown here, the baseplate 15 is rectangular. The baseplate 15 can be divided into the first region 22a and into a second region 22b. Here two linear guides 13 are arranged on the baseplate 15. The carriage 14b is configured in such a manner that it can be moved along the linear guides 13. In the embodiment shown here, the linear guides 13 each comprise a guide rail (concealed in the illustration of FIGS. 1a and 1b) by means of which the carriage 14b can be precisely moved.

In the embodiment shown here, the drive motor 16 is in the form of an electric motor 16a, more precisely a stepping motor 16a'. The drive motor 16 is arranged here at a second end 23b of the baseplate 15. The force of the drive motor 16 is transmitted to the carriage 14b via here two drive means 17. The drive means 17 here comprise toothed belt drives 17'. Alternatively, the use of other drive means 17, such as, for example, drive chains and/or push rods, is also possible.

In the embodiment shown, the toothed belt drives 17' run over a drive deflection roller 17a and a belt pulley 17b. The drive deflection roller 17a is located in the immediate vicinity of the drive motor 16 at the second end 23b of the baseplate 15. The drive motor 16 can transmit a driving force which is generated to the drive deflection roller 17a. The belt pulley 17b is arranged opposite the drive deflection roller 17a at a first end 23a of the baseplate 15. The belt pulley 17b is mounted resiliently here on the baseplate 15 in the direction of the slider 14b in relation to the guide 13 via two spring tensioning elements 19. By means of the spring tensioning elements 19, the toothed belt drive 17' is automatically tensioned with a defined force. The pre-tensioning of the spring tensioning elements 19 remains the same even if the toothed belt drive 17' is distorted. In addition, the wear due to extension of the toothed belt drive 17' can be compensated for fairly easily.

In the embodiment shown here, the closure device 10 has an overall height $H_{ges}$ of 33 mm, an overall length $L_{ges}$ of 410 mm and an overall width $B_{ges}$ of 303 mm. The length and width are essentially determined by the size of the sample chamber. The baseplate serves at the same time as a cover for the sample chamber. The advantage resides here primarily in the low overall height. The closure device 10 thus takes up little space and is therefore particularly space-saving.

Function of the Closure Device

In the following paragraphs, the function of the closure device 10 will be explained by way of example.

At the beginning, the slider 14 is in an open position. In said open position, the carriage 14b is arranged together with the closure plate 14a partially in the first region 22a, is arranged completely in the second region 22b and is moved to the second end 23b of the baseplate 15 (not illustrated specifically).

The drive motor 16 is started and transmits its driving force to the drive deflection roller 17a. The drive deflection roller 17a moves the drive means 17 running over it. The drive means 17 are connected to the carriage 14b. The carriage 14b together with the closure plate 14a is moved laterally along the linear guide 13 via the drive means 17. The lateral movement takes place here until the carriage 14b has arrived at the first end 23a of the baseplate 15 and the stop bolts 14d, which are connected to the closure plate 14a, strike against the stops 15a. The closure plate 14a is then located directly above the input opening 11 in the first region 22a of the baseplate 15 in a closure position.

In order to press the closure plate 14a onto the input opening 11, the carriage 14b is moved further up to the first end 23a of the baseplate 15. Since the closure plate 14a can no longer be moved further laterally in the direction of the first end 23a, the movement of the carriage 14b is deflected via the four deflecting elements 14c into a movement perpendicular to the lateral movement. By this means, the closure plate 14a is moved toward the input opening 11 and the input opening 11 can therefore be closed gas-tightly.

In order to be able to close the input opening 11 gas-tightly, a closure force $F_{cl}$, which is exerted on the input opening 11 by the slider 14, has to be greater than the sum of the spring forces $F_{sp}$ of the four spring spacer elements 21 and the force $F_{gp}$, which is exerted on the input opening 11 by the gas pressure in the interior of the sample chamber, that is to say $F_{cl} > F_{sp} + F_{gp}$. A resistance force $F_{Res}$, which presses onto the input opening 11, can then be determined by $F_{res} = F_{cl} - F_{sp} - F_{gp}$.

In order to lift the closure plate 14a off again from the input opening 11, the drive motor 16 is adjusted in such a manner that the drive means 17 are now moved in the opposite direction. The carriage 14b is therefore moved onto the second end 23b of the baseplate 15. The closure plate 14a is lifted off from the input opening 11 only perpendicularly to the movement of the carriage 14b. The closure plate 14a is then moved back from the closure position into the open position via the carriage 14b. The input opening 11 is then free.

Further Embodiments According to the Invention

Figure 2A:
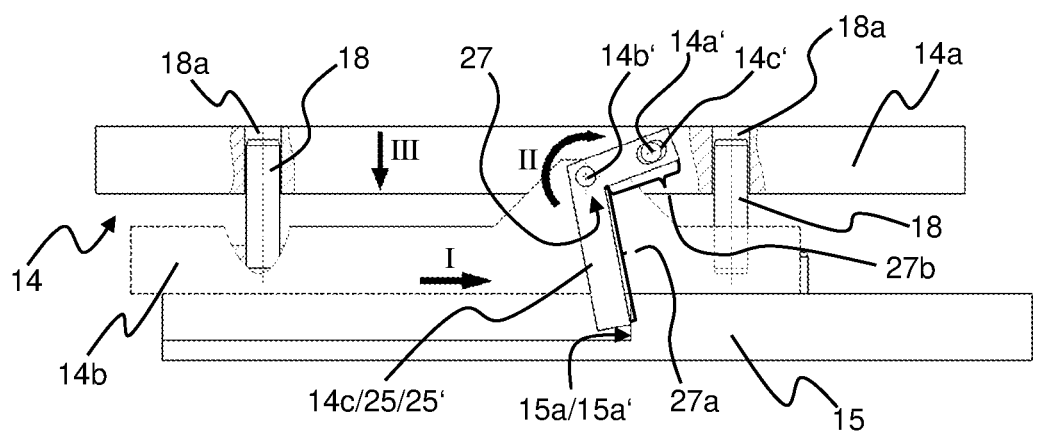
FIG. 2a shows a schematic side view of the slider and the baseplate of an exemplary further embodiment of the closure device according to the invention with a deflecting element which is designed as a rotary lever, with the respective direction of movement of the interacting components being shown by arrows.

FIG. 2a shows a schematic side view of the slider 14 and the baseplate 15 with the stop 15a of an exemplary further embodiment of a closure device 10 according to the invention. For the sake of clarity, the drive motor 16 is not illustrated specifically in this figure. However, it is pointed out that the slider 14 which is illustrated here is likewise moved by a drive motor 16.

In the embodiment shown here, the slider 14 comprises the rectangularly shaped closure plate 14a, the carriage 14b and the deflecting element 14c. The deflecting element 14c is configured here as a rotary lever 25, more precisely as a rotatably mounted curved, rigid lever 25'. A long arm 27a of the rotary lever 25 points in the direction of the baseplate 15 and a short arm 27b of the rotary lever 25 points in the direction of the closure plate 14a. The rotary lever 25 is mounted rotatably on the carriage 14b via a rigid shaft 14b', which is embedded in the carriage 14b, in a connecting region 27 in which the long arm 27a and the short arm 27b of the rotary lever 25 meet.

At the end of the short arm 27b of the rotary lever 25, the short arm 27b has an elongated hole 14c'. A pin 14a' which is rigidly connected to the closure plate 14a engages in said elongated hole 14c'. The closure plate 14a and the rotary lever 25 are thereby connected to each other. Furthermore, the embodiment shown here shows two vertical guide devices 18 which each partially protrude into here two cylindrical guide recesses 18a recessed in the closure plate 14a.

The functioning of the embodiment shown here will be briefly described once again below.

The carriage 14b is moved in a lateral movement (see movement arrow I) in the direction of the stop 15a which, in the embodiment shown here, is configured in the form of a stop protrusion 15a'. As soon as the rotary lever 25 butts against the stop 15a, the further lateral movement of the carriage 14b is deflected via the rotary lever 25 into a movement perpendicular to the lateral movement (see movement arrow II). By this means, the deflected perpendicular movement is transmitted to the closure plate 14a and the closure plate 14a is pulled downward (see movement arrow III) and pressed onto the input opening (not illustrated specifically).

So that the closure plate 14a does not slip during the perpendicular movement, it is guided by its guide recesses 18a along the vertical guide devices 18. In order to reverse the movement, the carriage 14b is moved laterally in the opposite direction of the stop 15a.

Figure 2B:
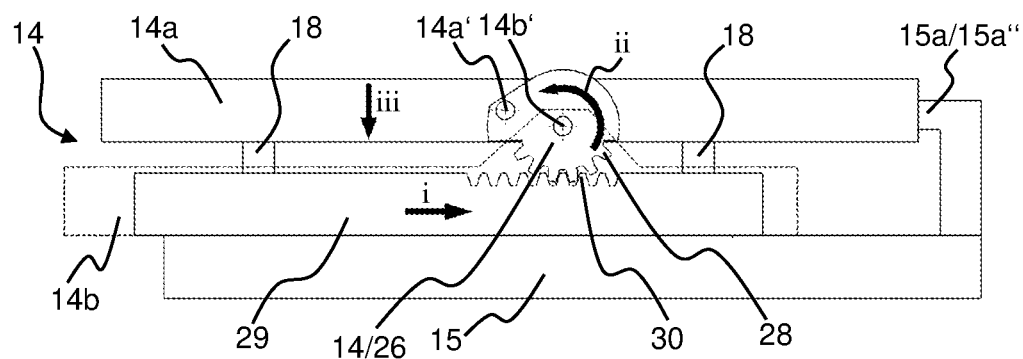
FIG. 2b shows a schematic side view of the slider and the baseplate of an exemplary further embodiment of the closure device according to the invention with a deflecting element which is in the form of a toothed wheel with an eccentrically arranged axis, with the respective direction of movement of the interacting components being shown by arrows.

FIG. 2b shows a schematic side view of the slider 14 and the baseplate 15 with the stop 15a of an exemplary further embodiment of a closure device according to the invention. For the sake of simplicity, the drive motor 16 is not illustrated specifically in this figure either. However, it is pointed out that the slider 14 which is illustrated here is likewise moved by a drive motor 16.

In the embodiment shown here, the slider 14 comprises the rectangularly shaped closure plate 14a, the carriage 14b and the deflecting element 14c. The deflecting element 14c is configured here as a toothed wheel 26 with six toothed wheel teeth 28. Instead, a completely toothed wheel may also be used here. The permissible overall height is the criterion which defines the structural form. A rack 29 which is connected here to the carriage 14b so as to be movable in the direction i and in spring-mounted fashion is guided over the baseplate 15. At said rack 29, the motor force is initiated and the entire slider 14 moved. The guide device 18 is fixedly connected to the carriage 14b. Seven rack teeth 30 are recessed in the rack 29. A completely toothed rack can also be used here. In the figure, this is intended to be a schematic indication of the teeth. The toothed wheel 26 and the rack 29 intermesh via the teeth 28, 30 thereof. The toothed wheel 26 is mounted rotatably on the carriage 14b via the rigid shaft 14b' which is embedded in the carriage 14b. The closure plate 14a is connected to the toothed wheel 26 via the pin 14a', which is rigidly connected to the closure plate 14a. The pin 14a' is arranged eccentrically here with respect to the toothed wheel axis. Furthermore, the embodiment which is shown here shows the two vertical guide devices 18.

The functioning of the embodiment shown here will be briefly described once again below.

The carriage 14b with the rack 29 is moved in a lateral movement (see movement arrow i) in the direction of the stop 15a which, in the embodiment shown here, is in the form of a stop element 15a" which is fastened to the baseplate 15. As soon as the closure plate 14a butts against the stop 15a, the further lateral movement of the carriage 14b is deflected via the toothed wheel 26, which is moved via the rack teeth 30 of the rack 29, into a movement perpendicular to the lateral movement (see movement arrow ii). By this means, the deflected, perpendicular movement is transmitted to the closure plate 14a and the closure plate 14a is pulled downward (see movement arrow iii).

So that the closure plate 14a does not slip, the closure plate 14a is guided along the vertical guide devices 18. In order to reverse the movement, the carriage 14b is moved laterally in the opposite direction of the stop 15a.

Schematic Measurement Set-Up

Figure 3:
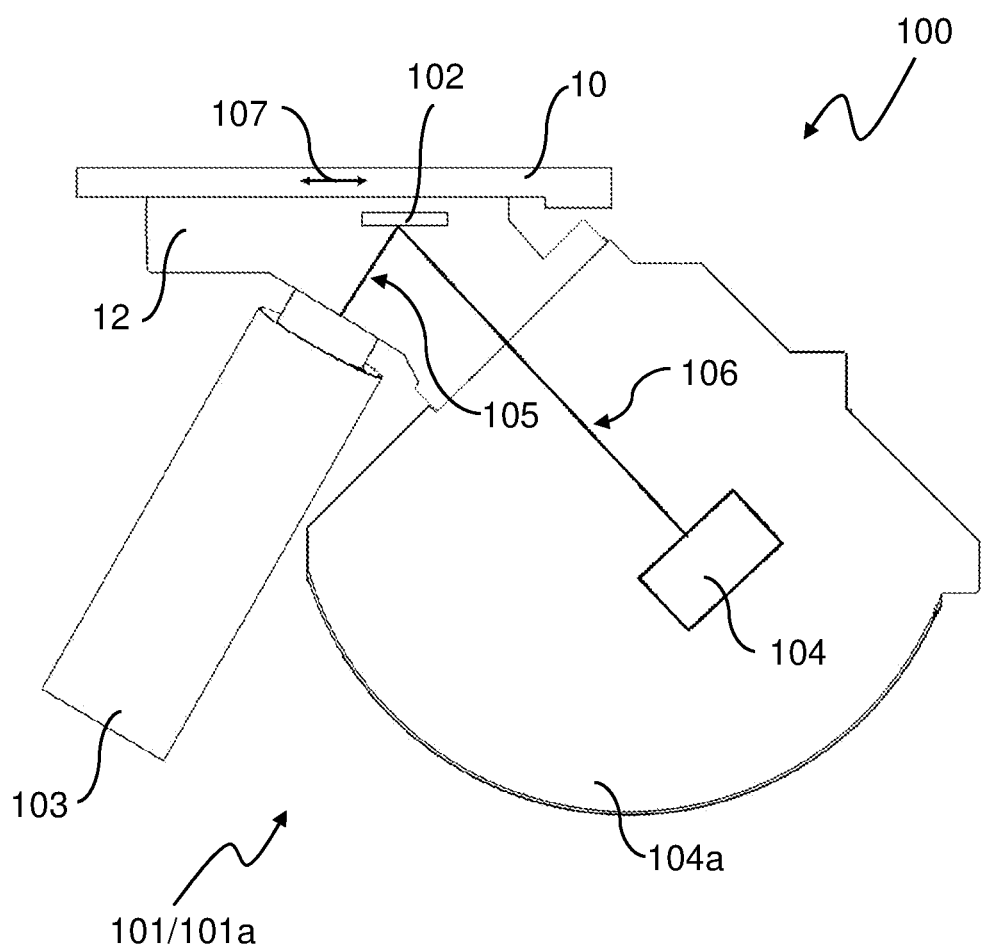
FIG. 3 shows a schematic measurement set-up for carrying out x-ray fluorescence measurements with an x-ray analysis apparatus using the closure device according to the invention.

FIG. 3 shows a schematic measurement set-up 100 in which the closure device 10 according to the invention is used.

The measurement set-up 100 comprises an x-ray analysis apparatus 101 which is embodied here as x-ray fluorescence spectrometer 101a. The x-ray fluorescence spectrometer 101a comprises a sample chamber 12 with a measurement sample 102 (for example a liquid measurement sample) inserted into the sample chamber 12, the closure device 10, an x-ray source 103, a detector 104 and a detector chamber 104a in which the detector 104 is arranged.

In the illustration shown here, the closure device 10 closes the sample chamber 12 gas-tightly (as described with reference to FIGS. 1a and 1b; also see the movement arrow 107 in FIG. 3). A protective gas, generally argon, is introduced into the sample chamber 12, and a slight positive pressure prevails in the sample chamber 12. The positive pressure presses against the input opening (not illustrated specifically here, but see FIG. 1b) in the sample chamber 12. The closure plate (not illustrated specifically, but see FIG. 2a, for example) is pressed onto the input opening in the sample chamber 12. The measurement sample 102 is then excited with highly energetic radiation 105 via the x-ray source 103 and the x-ray radiation 106 emitted by the measurement sample 102 is captured at the detector and evaluated.

After the measurement, the closure device 10 can be opened in a simple manner and the measurement sample 102 retrieved from the sample chamber 12 via the input opening. A further measurement sample 102 can then be inserted into the sample chamber 12 and the input opening closed tightly to positive pressure (or optionally also vacuum-tightly) by the closure device 10 for the next measurement.

The invention claimed is:

1. A closure device for providing a gas-tight closing of an input opening of a sample chamber of an x-ray analysis apparatus, comprising:
a slider having a closure plate and a carriage that is configured to be displaced in a lateral movement over the input opening on a linear guide arranged on a baseplate connected fixedly to the sample chamber;
deflecting elements that connect the closure plate in an articulated manner to the carriage, the deflecting elements, upon butting against end stops connected rigidly to the baseplate, deflecting the lateral movement of the carriage into a movement perpendicular thereto to press the closure plate over the input opening; and
a drive motor that is connected to the carriage via a drive means and that displaces the slider to provide said lateral movement on the linear guide.

2. The closure device as claimed in claim 1, wherein at least some of the deflecting elements are rotary levers.

3. The closure device as claimed in claim 2, wherein the rotary levers comprise curved, rigid levers rotatably mounted on the carriage about a rigid shaft.

4. The closure device as claimed in claim 2, wherein each rotary lever has a portion with an elongated hole that receives a pin connected rigidly to the closure plate.

5. The closure device as claimed in claim 2, wherein the closure plate is rectangular, and wherein the deflecting elements comprise at least three of said rotary levers.

6. The closure device as claimed in claim 1, wherein the linear guide comprises a guide rail arranged in or on the baseplate.

7. The closure device as claimed in claim 1, further comprising a vertical guide device that guides the movement of the closure plate in said direction perpendicular to the lateral movement.

8. The closure device as claimed in claim 1, further comprising spring spacer elements arranged between the closure plate and the carriage that hold the closure plate and the carriage apart at a predetermined distance.

9. The closure device as claimed in claim 1, further comprising stop bolts attached to the closure plate that butt against said end stops when the carriage arrives at a first end of the baseplate.

10. The closure device as claimed in claim 1, wherein the drive motor is an electric motor.

11. The closure device as claimed in claim 9, wherein the drive motor is a stepping motor.

12. The closure device as claimed in claim 1, wherein the drive means comprises at least one of a toothed belt drive, a drive chain, a push rod, a threaded spindle, a hydraulic slider, and a pneumatic cylinder.

13. The closure device as claimed in claim 12, wherein the toothed belt drive and/or the drive chain run via a drive deflection roller and a belt pulley.

14. The closure device as claimed in claim 13, wherein at least one of the drive deflection roller and the belt pulley are mounted resiliently, and tensioned with a predefined force, in the direction of the carriage relative to the baseplate, via a spring tensioning element.

15. The closure device as claimed in claim 1, wherein at least one of the closure plate and the sample chamber has a sealing ring in a region around the input opening.

16. The closure device as claimed in claim 15 wherein the sample chamber has a groove around the input opening that receives the sealing ring.

17. An x-ray analysis apparatus comprising the closure device as claimed in claim 1.

18. A method for providing a gas-tight closing of an input opening of a sample chamber of an x-ray analysis apparatus, the method comprising:
providing a slider having a closure plate and a carriage that is configured to be displaced in forward and return lateral movements over the input opening on a linear guide arranged on a baseplate connected fixedly to the sample chamber, the closure plate being connected in an articulated manner to the carriage with deflecting elements that butt against end stops connected rigidly to the baseplate when the slider is displaced in the forward lateral movement;
displacing the slider with a drive motor to provide said forward lateral movement on the linear guide;
when the deflecting elements butt against the end stops, transferring the forward lateral movement of the carriage into a movement perpendicular thereto with the deflecting elements to press the closure plate over the input opening; and displacing the slider with the drive motor to provide the return lateral movement and reverse the closing of the input opening.

* * * * *